United States Patent [19]

Riche

[11] 4,381,858
[45] May 3, 1983

[54] FLUID OPERATED WORKHOLDER

[75] Inventor: William R. Riche, Columbus, Ind.

[73] Assignee: Cummins Engine Company, Inc., Columbus, Ind.

[21] Appl. No.: 200,137

[22] Filed: Oct. 24, 1980

[51] Int. Cl.$^3$ .............................................. B23Q 3/08
[52] U.S. Cl. ....................................... 269/29; 269/57; 269/224; 269/226; 269/902; 269/909
[58] Field of Search .................... 269/20, 29, 57, 266, 269/224, 902, 909, 155

[56] References Cited

U.S. PATENT DOCUMENTS

| | | |
|---|---|---|
| 1,120,717 | 12/1914 | Hogan . |
| 1,453,176 | 4/1923 | Perrine ............................... 269/266 |
| 2,402,411 | 6/1946 | Kent . |
| 2,492,338 | 12/1949 | Vickers . |
| 2,517,941 | 8/1950 | Stubbs . |
| 3,395,911 | 8/1968 | Baxter . |
| 3,770,260 | 11/1973 | Rhom . |
| 3,982,740 | 9/1976 | Gutman ............................... 269/155 |
| 4,008,886 | 2/1977 | Murdoch ............................. 269/266 |
| 4,017,703 | 4/1977 | Lavins et al. ......................... 269/57 |

FOREIGN PATENT DOCUMENTS 2142255  3/1972  Fed. Rep. of Germany ...... 269/266

*Primary Examiner*—Robert C. Watson

*Attorney, Agent, or Firm*—Sixbey, Friedman & Leedom

[57] ABSTRACT

This invention relates to a fluid operated, positioning apparatus for a workholder (43, 144, 146, 148, 150) for maintaining the locating surfaces (22 and 24) of a workpiece, such as a crosshead (2), in contact with fixed abutments (62 and 68) of a workholder (43, 144, 146, 148, 150) designed to receive workpieces (2) subject to substantial manufacturing tolerances in which forces are imparted to each workpiece (2) during machining operations which tend to move the locating surfaces (22 and 24) of the workpiece (2) away from the fixed abutments (62 and 64) of the workholder. The positioning apparatus (44) includes an L-shaped member (46) in which are mounted a movable pin (70) operating in an advanced position to clamp a crosshead against fixed abutments (62 and 64) of the workholder (43, 144, 146, 148, 150) and a retracted position in which the crossheads (2) may be inserted and removed from the workholder (43, 144, 146, 148, 150). Movable pin (70) is operable by means of a second piston (96) and threaded pin (100) which is accessible from an end surface of one leg portion (50) of the L-shaped member (46). Opposite parallel longitudinal movement of the movable pin (70) and second piston (96) is effected by means of a hydraulic link means (107).

15 Claims, 7 Drawing Figures

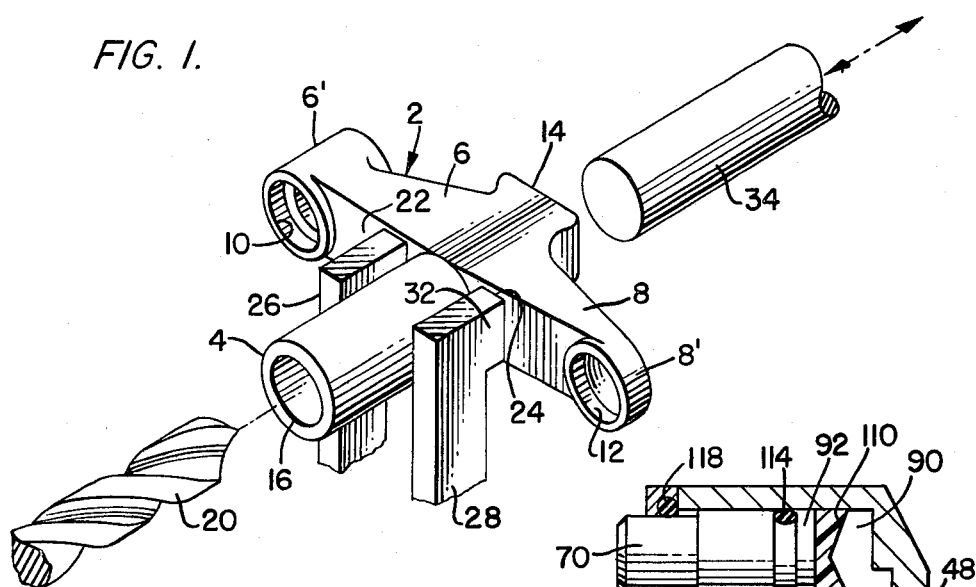

FLUID OPERATED WORKHOLDER

DESCRIPTION

1. Technical Field

This invention relates to apparatus for holding workpieces accurately during machining operation and in particular apparatus for holding accurately valve crossheads for internal combustion engines during machining operations on the valve crossheads.

2. Background Art

In satisfying successfully the often conflicting demands for close manufacturing tolerances and low cost operation, machine tool designers have found the proper design of workholders to be critical. In particular, a workholder must be designed to allow workpieces to be loaded and unloaded quickly and to allow the workpieces to be properly positioned throughout all machining operations. Accuracy in positioning is normally achieved by providing each workholder with a fixed abutment adapted to engage a locating surface, such as an index hole or planar surface, on the workpiece. A properly designed workholder in such circumstances must operate to maintain the locating surface of the workpiece in contact with the fixed abutment during all machining operations on the workpiece.

The necessity for maintaining proper positioning is often complicated by the fact that forces induced in the workpiece during machining operations may tend in certain situations to move the workpiece locating surface away from the fixed abutment of the workholder. For example, in a multispindle machine tool, several spindles may be arranged around a rotatable indexing table for carrying plural workholders from one spindle to the next during each indexing operation. Normally, the longitudinal axis of each spindle is arranged radially with respect to the rotational axis of the indexing table. Upon movement of one of the boring tools radially inwardly, a component of force is imparted to the corresponding workpiece which tends to move the workpiece toward the rotational axis of the indexing table. If the locating surface of the workpiece is arranged on the side of the workpiece facing the tool spindle, the forces imparted to the workpiece during the spindle feedstroke will tend to dislodge the locating surface from contact with the fixed abutment of the workholder.

To achieve desired positioning accuracy in such multispindle machine tools, a mechanically movable stop could be arranged in the workholder in opposed relationship with the fixed abutment of the workholder to trap the workpiece between the abutment and stop. However, in order to avoid workpiece movement during a machining operation, the mechanically movable stop must be rigidly fixed in position thereby necessitating high strength and sometimes bulky supports and mechanical movements. The amount of space available for accommodating a mechanically movable stop can be quite limited on certain rotatable indexing tables due to the requirement for plural workholders and for restraining each workpiece in three dimensions. For example, loading and unloading of workpieces normally occurs at a station located radially outwardly from the circumference of the indexing table. It is therefore desirable to place the movable stop controls adjacent the radial extremities of the workholder remote from the movable stop. When a mechanical mechanism is used for moving the stop, a system of levers or rotatable shafts must be provided between the operator station and the movable stop, thereby increasing considerably the cost and size of the workholder.

Attempts to employ nonmechanical actuators on indexing tables such as illustrated in U.S. Pat. No. 3,395,911 to Baxter have not addressed the problem described above. In particular, the system shown in Baxter discloses a valve controlled fluid actuated mechanism for clamping workpieces in workholders but does not disclose a system wherein each workpiece is provided with a location surface which tends to be moved away from a fixed abutment in the workholder during the feedstroke of a machine tool spindle. Moreover, the Baxter patent includes no provision for the operator to control the force applied to the workpiece by a movable stop which is important in avoiding either too much or too little force being applied to the workpiece. Fluid operated clamps are also well known including manually operated threaded actuators for displacing fluid between a master cylinder and a remote slave cylinder to actuate a clamp as illustrated in the following U.S. Patents:

U.S. Pat. No. 1,120,717 to Hogan
U.S. Pat. No. 2,402,411 to Kent
U.S. Pat. No. 2,492,338 to Vickers
U.S. Pat. No. 2,517,931 to Stubbs
U.S. Pat. No. 3,770,260 to Rhom However, none of these fluid operated clamp disclosures teaches how to redesign a workholder to provide the necessary small size and ease of operation as is required in the operation of highly automated machine tools.

DISCLOSURE OF THE INVENTION

It is a general object of this invention to overcome the deficiencies of the prior art by providing apparatus for holding a workpiece having a locating surface in a precise predetermined position by maintaining the locating surface in contact with a fixed abutment despite forces imparted to the workpiece during machining operations which tend to move the locating surface of the workpiece away from the fixed abutment.

A more specific object of this invention is to provide apparatus for holding a workpiece having a locating surface in a precise predetermined position during multiple machining operations occuring at plural workstations circularly arranged about a central axis with each machining operation causing displacing forces in the workpiece tending to move the workpiece toward the central axis.

Yet another object of this invention is to provide a fluid operated workholder for maintaining the locating surface of a workpiece in contact with a fixed abutment despite substantial manufacturing tolerances in the various workpieces placed in the workholder.

Still another object of the subject invention is to provide a fluid operated workholder for maintaining the locating surface of the workpiece in contact with a fixed abutment when forces are imparted to each workpiece during a machining operation which tends to move the locating surface of the workpiece away from the fixed abutment and wherein the amount of force applied in holding the workpiece locating surface against the fixed abutment may be controlled initially by manual operation of a remotely positioned control means.

Still another object of the subject invention is to achieve all of the aforestated objects by means of a highly compact mechanically simple structure capable of being easily manufactured and positioned on the rotatable indexing table of a multispindle machine tool.

The above noted objects are achieved by provision of positioning apparatus including a support body having a first fluid cavity, a first piston mounted for movement within the first fluid cavity and an adjustable stop means connected with the first piston for movement toward and away from a fixed abutment of the workholder between a retracted position and an advanced position in which the locating surface of the inserted workpiece is maintained in contact with the fixed abutment. The positioning apparatus also includes operator means for moving the adjustable stop means from the retracted position to the advanced position by a distance which depends upon the size of the inserted workpiece and for holding the locating surface of each inserted workpiece against the fixed abutment of the workholder during machining operations on an inserted workpiece by preventing movement of the adjustable stop means during all such machining operations. The operator means achieves these functions by including an operator body containing a second fluid cavity, a second piston mounted for movement within the second fluid cavity, a control means for moving the second piston to control initially the amount of force applied to the workpiece by the adjustable stop means and for fixing the second piston in an advanced position during all machining operations on the inserted workpiece and finally including a hydraulic link means for causing the first piston to move in response to movement of the second piston. The hydraulic link means includes a fluid flow path between the first and second fluid cavities and an incompressible fluid filling the fluid flow path whereby movement of the second piston to its advanced position and fixation of the second piston in the advanced position by the control means will cause the first piston to advance and become fixed in its position as long as the control means maintains the second piston in its advanced position.

Numerous other objects and purposes are achieved by virtue of additional structural features of the subject invention as described and discussed in greater detail hereinbelow.

BRIEF DESCRIPTION OF THE DRAWINGS

FIG. 1 is a partially cut away perspective view of a workholder in which a workpiece is mounted for machining in a manner which would tend to dislodge the workpiece from fixed locating abutments of the workholder;

FIG. 2 is a cross-sectional, partially cutaway view of a retaining mechanism for an adjustable pin of the type illustrated in the workholder of FIG. 1;

FIG. 4 is a cross-sectional view of the positioning apparatus of FIG. 3 taken along lines 4—4;

BEST MODE FOR CARRYING OUT THE INVENTION

Figure 5:
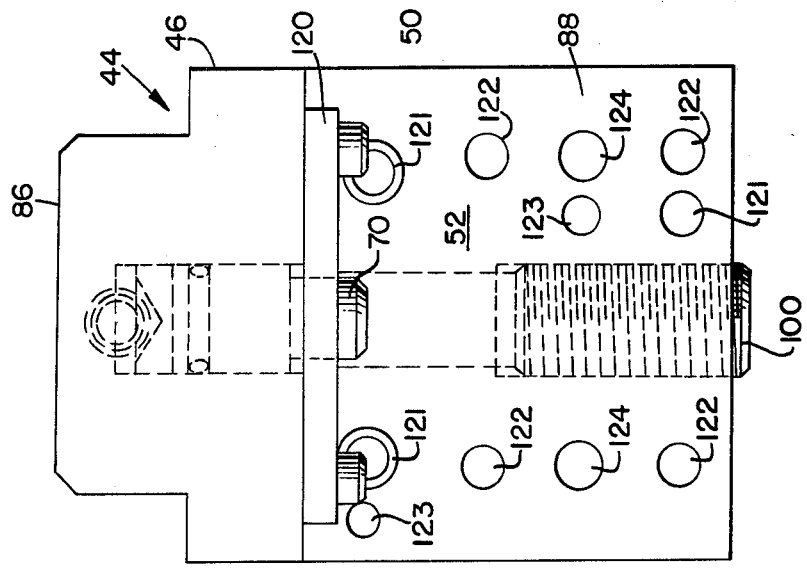
FIG. 5 is a top elevational view of the positioning apparatus of FIG. 4.

For a complete understanding of the subject invention, it is necessary to appreciate the problems associated with accurately holding a workpiece during machining operations which tend to dislodge the workpiece from a desired location. In particular, FIG. 1 illustrates a partial perspective view of a workholder in which is placed a specific workpiece known as a crosshead 2 employed in the valve train of an internal combustion engine. Crossheads are used to transmit opening motion simultaneously from an engine cam shaft to a pair of valves (either exhaust or intake) so that such valves will operate in unison. The crosshead illustrated in FIG. 1 includes a central stem 4 and a pair of laterally extending arms 6 and 8. At the extremities 6' and 8' of the laterally extending arms 6 and 8, recessed cavities 10 and 12 are formed, respectively, to engage the valve stems of the valves being simultaneously operated by the crosshead 2. Opening pressure is applied to the crosshead via an upper cam surface 14. Central stem 4 contains a central bore 16 for receiving an upstanding guide pin, not illustrated, to properly position the crosshead during its reciprocating movement within the engine. In order to form the central bore 16 in central stem 4, it is necessary to properly position the crosshead 2 relative to a longitudinally advancable drill bit 20 while the crosshead is held in a precisely known predetermined position.

For reasons not pertinent to the present disclosure, the crosshead blank 2 is initially formed with locating surfaces 22 and 24 on each side of the laterally extending arms 6 and 8 adjacent the central stem 16 on the side of the arms facing the drill bit 20. To properly position the crosshead 2 it is necessary to provide a pair of fixed abutments 26 and 28 having projections 30 and 32 for contacting locating surfaces 22 and 24, respectively. As can be clearly seen from FIG. 1, advancement of drill bit 20 for purposes of forming central bore 16 will have the effect of imparting a component of force in crosshead 2 which will tend to separate locating surfaces 22 and 24 from fixed abutments 26 and 28.

Operation of a workholder, as partially illustrated in FIG. 1, must necessarily include some type of structure for resisting the force imparted by drill bit 20 in order to maintain the crosshead in the proper position throughout the boring operation. For example, a movable pin 34 may be provided for displacement between a retracted position in which crossheads may be inserted and removed from the workholder and an advanced position in which the locating surfaces of a crosshead 2 are maintained in contact with the fixed abutments 26 and 28 of the workholder.

Of vital importance to the accurate operation of the workholder of FIG. 1 is the maintenance of pin 34 in its advanced position throughout the machining operation of drill bit 20. In FIG. 2, one technique for holding pin 34 in its advanced position is illustrated. By this technique, a notch 35 is formed in pin 34 having a forwardly inclined surface 36 against which a detent 38 may be urged by a manually adjustable screw threaded bolt 40. By this arrangement bolt 40 may be rotated to advance detent 38 and prevent rearward movement of pin 34 during the feed stroke of a drill bit such as illustrated in FIG. 1. Unfortunately, experience with a mechanism of the type illustrated in FIG. 2 has shown that some mechanical distortion of the mechanism can be expected which will permit pin 34 to be displaced upon operation of the drill bit. Increased pressure by means of applying additional torque to bolt 40 has not been shown to be effective in obviating the problem. While increasing the size of pin 34 and detent 38 as well as the support structure 42 in which they are supported could be expected to improve the holding capability of pin 34. This approach has the significant drawback of requiring more room than is available in a practical embodiment of the subject invention as will be discussed more fully hereinafter.

Figure 3:
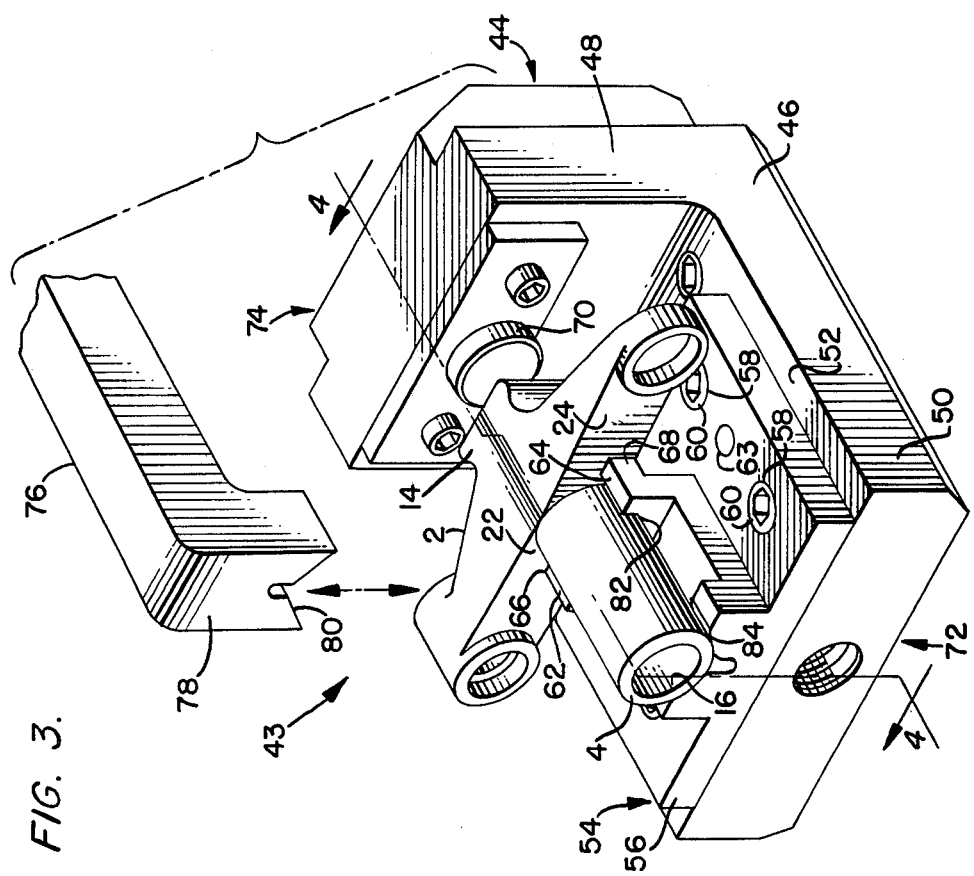
FIG. 3 is a partially cut-away, perspective view of a workholder employing positioning apparatus designed in accordance with the subject invention.

Turning now to FIG. 3, a workholder 43 including a specific positioning apparatus 44 designed in accordance with the subject invention is illustrated. Positioning apparatus 44 includes a generally L-shaped member 46 having one leg portion 48 generally vertically oriented and another leg portion 50, generally horizontally oriented, connected integrally with leg portion 48. The lateral side 52 of leg portion 50 provides a support surface for a fixture means 54 for providing vertical support to a crosshead 2 placed within the workholder 43 of which positioning apparatus 44 is a part. Fixture means 54 includes a base 56 attached to lateral side 52 by connecting means 58 such as threaded bolts 60 only two of which are illustrated in FIG. 3. Extremely accurate positioning of fixture means 54 with respect to leg portion 50 is achieved by use of guide pins, not illustrated, received in bores 63, only one of which is illustrated in FIG. 3. Fixture means 54 further includes a pair of fixed abutments 62 and 64 corresponding to abutments 26 and 28 of FIG. 1. The projections 66 and 68, like projections 30 and 32 of FIG. 1, serve to engage locating surfaces 22 and 24 of crosshead 2.

Positioning apparatus 44 further includes a movable pin 70 for engaging upper cam surface 14 of crosshead 2 when the movable pin 70 is advanced, thereby holding locating surfaces 22 and 24 in engagement with fixed abutments 62 and 64 of fixture means 54. As will be described in greater detail hereinbelow, movable pin 70 is actuated by an operator means 72 contained partially within leg portion 50. The operator means 72 functions to move pin 70 from a retracted position to an advanced position by a distance which depends on the exact size of the inserted workpiece and further operates to hold the locating surfaces of crosshead 2 against the fixed abutments 62 and 68 during the entire machining operation on the crosshead 2 by preventing reverse movement of piston 70 as will also be further described hereinbelow. Movable pin 70 and the supporting section of leg portion 48 forms an adjustable stop means 74 for movement toward and away from the fixed abutments 62 and 64 of workholder 43. The exact shape of the adjustable stop means 74 including pin 70 may take a variety of forms. For example the movable pin 70 may be replaced by a rod having a square cross-section or a rotatably mounted lever adapted to rotate between a retracted and advanced position.

An important element of the subject invention involves the provision of a hydraulic link, not illustrated in FIG. 3, as part of operator means 72 for actuating the adjustable stop means 74 whereby the necessity to include bulky or complicated mechanical movement and/or use manual operators positioned immediately adjacent the adjustable stop means 74 has been eliminated. The importance of providing a highly compact operating mechanism for the adjustable stop means 74 is illustrated in part in FIG. 3 wherein a vertically movable clamping member 76 is illustrated having a head portion 78. On the lower portion of head portion 78 is formed a V-shaped seat 80 for engaging the upper surface of the central stem 4 of crosshead 2. The lower side of central stem 4 is received in a pair of V-shaped seats 82 and 84 of fixture means 54. Seats 82 and 84 operate in conjunction with seat 80 to clamp vertically the central stem 4 when vertical clamping member 76 is lowered into its operative position. As can be appreciated from FIG. 3, vertical clamping member 76 leaves very little room for the inclusion of mechanical operator structure for advancing pin 70 and for maintaining pin 70 in its advanced position during the machining operation of central bore 16. It is an important purpose of this invention to provide a highly compact support for crossheads 2 when placed in a workholder such as illustrated in FIG. 3 thereby maintaining the crosshead in an exact predetermined position as the central bore 16 is machined in central stem 4. Obviously this function can be performed only if movable pin 70 is capable of being conveniently retracted during the loading and unloading operation of the workholder and easily advanced to a fixed position which is positively held against longitudinal movement as the drill bit is advanced inwardly along the longitudinal axis of central stem 4.

Figure 6:
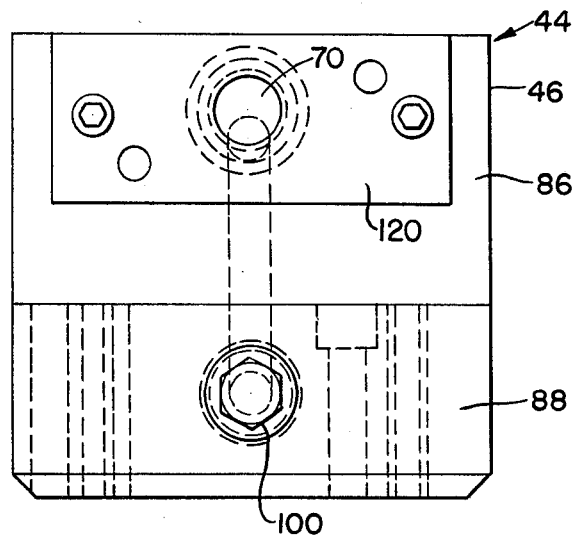
FIG. 6 is a front side elevational view of the positioning apparatus illustrated in FIGS. 4 and 5.

Reference will now be made to FIGS. 4 through 6 which disclose in much greater detail, the configuration and construction of the L-shaped member 46 which forms the positioning apparatus 44 of the subject invention. Leg portion 48 of member 46 forms a support body 86 containing a first fluid cavity 90. Within cavity 90 is disposed a first piston 92 connected integrally with movable pin 70 such that advancement and retraction and piston 92 will cause pin 70 to advance and retract. Leg portion 50 of L-shaped member 46 forms a portion of operator means 72 by providing an operator body 88 which contains a second fluid cavity 94 within which is disposed a second piston 96 mounted for advancement and retraction within fluid cavity 94. Control means 98 for controlling initially the amount of force applied to the crosshead by the adjustable stop means 74 is also included within operator means 72. Control means 98 may take the form of a threaded pin 100 received in threaded bore 102 of operator body 88. Because threaded pin 100 is integrally connected with second piston 96 and because threaded bore 102 is coaxially aligned and interconnected with fluid cavity 94, rotational movement of pin 100 has the effect of advancing and retracting piston 96, respectively, within fluid cavity 94. Since threaded bore 102 extends to the end surface 104 of leg portion 50, a wrench connection such as an allen head socket 106 may be provided at one end of the threaded pin 100 for defining a connecting means for connecting the threaded pin to a manually operable torque applying device such as an allen wrench. This arrangement allows the threaded pin 100 to be rotated for applying an adjustable amount of torque to the crosshead by movable pin 70 in the manner to be described hereinbelow.

A fluid flow path 108 formed within L-shaped member 46 interconnects fluidically first and second fluid cavities 90 and 94. When the fluid cavities and flow path 108 are filled with a noncompressible fluid, forward and rearward movement of second piston 96 caused by rotation of threaded pin 100 will result in advancement and retraction of pin 70. The longitudinal axes of the fluid cavities are parallel as illustrated in FIG. 4 and movable pin 70 is mounted to project from the lateral side of leg portion 48 such that movable pin 70 projects in the same direction as leg portion 50. By this arrangement, movable pin 70 and threaded pin 100 move in opposite directions along their respective longitudinal axes upon rotation of threaded pin 100. Because of the incompressible nature of the fluid filling flow path 108, and because of the frictional contact between the threads of pin 100 and threaded bore 102, movable pin 70 moves in precise correspondence to movement of second piston 96 and is held in that position until threaded pin 100 is again rotated. Flow path 108 and the incompressible fluid therein form a hydraulic link means 107 causing piston 92 to move in unison with piston 96. To insure against leakage of the noncompressible fluid, resilient sealing members 110 and 112 are associated with first and second pistons 92 and 96, respectively. Resilient O-rings 114 and 116 are also associated with first and second pistons 92 and 96, respectively, to provide additional sealing capability. Still more sealing capability is provided by packing material 118 held in place by retaining plate 120 around the projecting end of movable pin 70.

As best illustrated in FIG. 5, the lateral side 52 of leg portion 50 is designed to support base 56 of fixture means 54 (illustrated in FIG. 3) such that the crosshead, designed to be supported by fixture means 54, is held in appropriate position to cause the fixed abutments 62 and 64 of the fixture means 52 to properly interact with movable pin 70. During a machining operation as described with reference to FIG. 1 the locating surfaces 22 and 24 of a crosshead would tend to be displaced from the fixed abutments of a fixture means such as fixture means 54. However, the incompressible nature of the fluid filling the flow path 108 and the ability of threaded pin 100 to resist longitudinal movement when rotated to a desired position by the workholder operator, prevents backward movement of movable pin 70 during the machining operation and thereby assures that locating surfaces 22 and 24 will be maintained in proper contact with abutment 62 and 68. As further illustrated in FIG. 5, threaded bores 122 are formed in operator body 88 to receive threaded bolts 60 (illustrated in FIG. 3). Moreover, positioning holes 124 are designed to receive guide pin projecting into guide holes 63. Finally, as illustrated in FIG. 5, fastener receiving holes 121 and guide holes 123 are provided in leg portion 50 for holding the L-shaped member 46 in the workholder 43 (FIG. 3).

Figure 7:
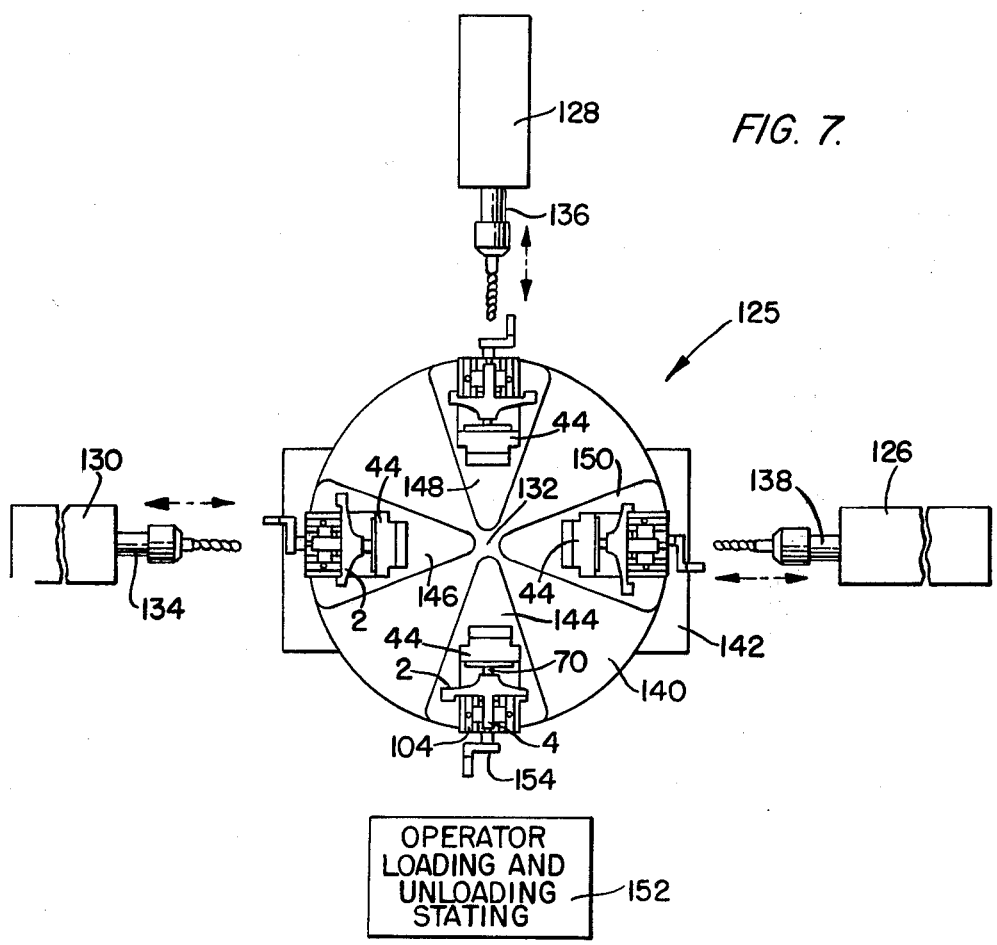
FIG. 7 is a top elevational view of a multispindle machine tool including a rotatable indexing table upon which are mounted four toolholders employing positioning apparatus designed in accordance with the subject invention.

Turning now to FIG. 7, the top elevational view of a multispindle machine tool 125 is illustrated in which workholders designed in accordance with the subject invention are employed. The multispindle machine tool 125 includes plural work stations 126, 128 and 130 arranged about a central axis 132. A longitudinally advanceable spindle 134, 136, 138 is positioned at each work station for movement radially toward central axis 132. A rotatable indexing table 140 is mounted on base 142 for rotation about the central axis 132. Four separate workholders 144 through 150 are mounted for rotation on indexing table 140. Each workholder is supplied with a positioning apparatus 44 of a type illustrated in FIGS. 3 through 6. The L-shaped body of each workholder is mounted so that the central stem 4 of a crosshead placed therein will point radially outwardly from the central axis 132 such that the indexing table 140 may be positioned to cause a drill bit or other tool mounted in a spindle, such as spindle 134, to advance radially inwardly to form central bore 16 in the crosshead 2 or perform another machining operation.

The design of the subject positioning apparatus 44 facilitates loading and unloading of crossheads at an operator station 152 because movable pin 70 is operable from the end surface 104 of leg portion 50 positioned at the outer radial extreme of indexing table 140 where it can be easily reached by an operator. Although not illustrated in FIG. 7, a vertical clamping member 76 (See FIG. 3) would be associated with each positioning apparatus 44 and would overlie the portion of apparatus 44 containing the first fluid cavity 90 and movable pin 70. Thus, very little room would exist for complicated mechanical actuating members extending to the outer radial extremities of the indexing table. Moreover, the simple arrangement of the subject invention provides the convenience of positioning the controls for actuating the movable pin immediately adjacent the operator where a hand lever 154 is also positioned to operate vertical clamping member 76. The operative connection between hand lever 154 and the clamping member 76 is not illustrated but operates to convert a rotary motion of the lever 154 into vertical retraction and advancement of head 78 into and out of engagement with the upper surface of a central stem of a crosshead placed within the workholder of the subject invention.

INDUSTRIAL APPLICABILITY

Positioning apparatus has been disclosed which has particular utility for use in workholders requiring extremely rigid and accurate positioning of a workpiece while being compact in size and conveniently operated. The design of the positioning apparatus facilitates accurate positioning of workpieces subject to substantial manufacturing tolerances in which forces are imparted to each workpiece during machining operations which tend to move a locating surface of the workpiece away from a fixed abutment of the workholder. A more specific application of the subject invention is in the formation of the central bore in the stem of a valve crosshead for an internal combustion engine wherein the locating surfaces of the crosshead are positioned on a pair of laterally extending arms adjacent the stem of the crosshead. This crosshead configuration lends itself to formation on a multispindle machine tool having a rotatable indexing table in which the feed stroke of each spindle tends to displace the crosshead from fixed abutments in the workholder. The subject invention, however, would have application in the manufacture of any component wherein the same configuration of fixed abutments and machine tool imparted forces exist.

I claim:

1. Positioning apparatus for maintaining the locating surface of a workpiece in contact with a fixed abutment of a workholder designed to receive workpieces subject to substantial manufacturing tolerances in which forces are imparted to each workpiece during machining operations which tend to move the locating surface of the workpiece away from the fixed abutment of the workholder, comprising:
   (a) a support body having a first fluid cavity;
   (b) first piston mounted for movement within said first fluid cavity;
   (c) an adjustable stop means connected with said first piston for movement toward and away from the fixed abutment of the workholder between a retracted position in which workpieces may be removed from and inserted into the workholder and an advanced position in which the locating surface of the inserted workpiece is maintained in contact with the fixed abutment of the workholder;

(d) operator means for moving said adjustable stop means from said retracted position to said advanced position by a distance which depends on the size of the inserted workpiece and for holding the locating surface of each inserted workpiece against the fixed abutment of the workholder during machining operations on an inserted workpiece by preventing movement of said adjustable stop means during all such machining operations, said operator means including:

(1) an operator body containing a second fluid cavity, (2) a second piston mounted for movement within said second fluid cavity between a retracted position and an adjustable advanced position, (3) control means for moving said second piston between said positions to control initially the amount of force applied to the workpiece by the adjustable stop means and for fixing said second piston in said advanced position during all machining operations on an inserted workpiece, and (4) hydraulic link means for causing said first piston to move in response to movement of said second piston, said hydraulic link means including a fluid flow path between said first and second fluid cavities and an incompressible fluid filling said fluid flow path, whereby movement of said second piston to its advanced position and fixation of said second piston in said advanced position by said control means will cause said first piston to advance and become fixed in its position as long as said control means maintains said second piston in its advanced position and further wherein said support body and said operator body are integrally connected to form an L-shaped member, said first and second fluid cavities having parallel longitudinal axes oriented, respectively, to intersect the lateral side of one leg portion of said L-shaped member and the end surface of the other leg of said L-shaped member.

2. Apparatus as defined in claim 1, wherein said adjustable stop means includes a movable pin mounted to project from the lateral side of said one leg portion in the same direction as said other leg portion.

3. Apparatus as defined in claim 2, wherein said control means includes a threaded pin connected with said second piston, and wherein said operator body contains a threaded bore extending between said end surface of said other leg portion and said second fluid cavity to receive said threaded pin, whereby opposite rotational movement of said threaded pin will cause advancement and retraction, respectively, of said second piston within said second fluid cavity.

4. Apparatus as defined in claim 2, wherein said threaded pin includes a connecting means for connecting the threaded pin to a manually operable torque applying device for rotating said threaded pin and for applying an adjustable amount of torque to control the amount of force applied to the workpiece by said movable pin.

5. Apparatus as defined in claim 3, wherein said fluid flow path is connected with said first and second fluid cavities in a manner to cause said pistons to move in opposite longitudinal directions upon rotation of said threaded pin.

6. Apparatus as defined in claim 5, further including a fixture means for supporting a workpiece when inserted into the workholder, said fixture means including at least one projection forming part of the fixed abutment of the workholder, said projection being positioned in opposed orientation with said movable pin, said other leg portion including a lateral side parallel with the longitudinal axis of said movable pin and a fixture attaching means for attaching said fixture means to said lateral side of said other leg portion.

7. Apparatus as defined in claim 6, for use in positioning valve crossheads during machining operation wherein each crosshead includes a generally T-shaped body having a central stem and a pair of laterally extending arms having a pair of locating surfaces, respectively, located on said arms adjacent the central stem, and further wherein said fixture means includes a second projection, said first and second projections being positioned to contact the locating surfaces of the valve crosshead, said fixture means further including a pair of V-shaped seats for supporting the central stem of the valve crosshead.

8. Apparatus for holding a workpiece having a locating surface in a precise predetermined position during multiple machining operations occurring at plural work stations circularly arranged about a central axis with each machining operation causing displacing forces in the workpiece tending to move the workpiece toward the central axis, comprising:

(a) a base;

(b) an indexing table mounted on said base for intermittent rotation about the central axis around which the plural work stations are arranged;

(c) plural workholders mounted on said indexing table equal in number to the number of work stations plus one, each said workholder including:

(1) fixture means for supporting a workpiece when inserted into the workholder, said fixture means including at least one fixed abutment for engaging the workpiece locating surface in a manner that forces imparted to the workpiece during each machining operation will tend to move the locating surface of the workpiece away from said fixed abutment, (2) an adjustable stop means mounted for movement toward and away from said fixed abutment between a retracted position in which workpieces may be removed and inserted into the workholder and an advanced position in which the locating surface of the inserted workpiece is maintained in contact with said fixed abutment, and (3) operator means for moving said adjustable stop means for said retracted position to said advanced position by a distance which depends on the size of the inserted workpiece and for holding the locating surface of the workpiece against said fixed abutment by preventing movement of said adjustable stop means during all such machining operation, said operator means including control means positioned adjacent the radial outermost portion of said worktable for effecting movement of said ajustable stop means between the retracted and advanced positions and for initially controlling the amount of force applied to the workpiece by the adjustable stop means, and hydraulic link means for responding to movement of said control means to effect movement of said adjustable stop means, said hydraulic link means including a fluid flow path and an incompressible fluid filling said fluid flow path and wherein each said workholder includes a support body having a first fluid cavity and a first piston connected with said adjustable stop means, said first piston being disposed for movement within said first fluid cavity and wherein said operator means includes an operator body containing a second fluid cavity, a second piston mounted for movement within said second fluid cavity between a retracted position and an adjustable advanced position and further wherein said fluid flow path is connected with said first and second fluid cavities to cause said first and second pistons to move simultaneously between corresponding advanced and retracted positions and further wherein said support body and said operator body are integrally connected to form an L-shaped member, said first and second fluid cavities having parallel longitudinal axes oriented, respectively, to interesect the lateral side of one leg portion of said L-shaped member and the end surface of the other leg of said L-shaped member.

9. Apparatus as defined in claim 8, wherein said adjustable stop means includes a movable pin mounted to project from the lateral side of said leg portion in the same direction as said other leg portion.

10. Apparatus as defined in claim 9, wherein said control means includes a threaded pin connected with said second piston, and wherein said operator body contains a threaded bore extending between said end surface of said other leg and said second fluid cavity to receive said threaded pin, whereby opposite rotational movement of said threaded pin will cause advancement and retraction, respectively, of said second piston within said second fluid cavity.

11. Apparatus as defined in claim 10, wherein said threaded pin includes a connecting means for connecting the threaded pin to a manually operable torque applying device for rotating said threaded pin and for applying an adjustable amount of torque to control the amount of force applied to the workpiece by said movable pin.

12. Apparatus as defined in claim 10, wherein said fluid flow path is connected with said first and second fluid cavities in a manner to cause said pistons to move in opposite longitudinal directions upon rotation of said threaded pin.

13. Apparatus as defined in claim 12, wherein said fixed abutment includes at least one projection positioned in opposed orientation with said movable pin, said other leg portion including a lateral side parallel with the longitudinal axis of said movable pin and fixture attaching means for attaching said fixture means to said lateral side of said other leg portion.

14. Apparatus as defined in claim 13, for use in positioning valve crossheads during machining operation wherein each crosshead includes a generally T-shaped body having a central stem, and a pair of laterally extending arms having a pair of locating surfaces, respectively, located on said arms adjacent the central stem, and further wherein said fixture means includes a second projection, said first and second projections being positioned to contact the locating surfaces of the valve crosshead, said fixture means further including a pair of V-shaped seats for supporting the central stem of the valve cross-heads.

15. Positioning apparatus for maintaining the locating surface of a workpiece in contact with a fixed abutment of a workholder designed to receive workpieces subject to substantial manufacturing tolerances in which primary forces are imparted to each workpiece during machining operations which tend to move the locating surface of the workpiece away from the fixed abutment of the workholder and in which secondary forces less than said primary forces are imparted to the workpiece which tend to move the workpiece parallel to the fixed abutment, comprising (a) fixture means for supporting a workpiece when inserted into the workholder for contact with the fixed abutment;

(b) primary holding means for retaining a workpiece in said fixture means, said primary holding means including (1) a body containing first and second fluid cavities, said body has a generally L-shape with one leg containing said first cavity and the other leg containing said second cavity and wherein said fixture means is mounted directly on said other leg, (2) first and second pistons mounted for reciprocal movement within said fluid cavities, respectively, (3) hydraulic link means for causing said first piston to move in response to movement of said second piston, said hydraulic link means including a fluid flow path between said first and second fluid cavities and an incompressible fluid filling said fluid flow path, (4) an adjustable stop means connected with said first piston for movement toward and away from the fixed abutment of the workholder between a retracted position in which workpieces may be removed from and inserted into the workholder and an advanced position in which the locating surface of the inserted workpiece is maintained in contact with the fixed abutment of the workholder, and (5) control means for moving said second piston to control initially the amount of force applied to the workpiece by the adjustable stop means and for fixing said second piston in said advanced position during all machining operations on an inserted workpiece; and (c) secondary holding means for assisting said primary holding means to retain a workpiece in said fixture means, said secondary holding means includes clamping means separate from said adjustable stop means for clamping a workpiece in said fixture means to prevent the workpiece from moving parallel with respect to the fixed abutment.

* * * * *